United States Patent
Sato et al.

[11] Patent Number: 5,897,455
[45] Date of Patent: Apr. 27, 1999

[54] AUTOMATIC TRANSMISSION CONTROLLER FOR CONTROLLING THE ENGINE SPEED IN RESPONSE TO AN AIR CONDITIONER OPERATING STATE DURING A DOWNSHIFT

[75] Inventors: Hiroyuki Sato; Tomoo Mochizuki, both of Shizuoka-ken, Japan

[73] Assignees: Suzuki Motor Corporation; Jatco Corporation, both of Shizuoka-ken, Japan

[21] Appl. No.: 08/858,524

[22] Filed: May 19, 1997

[30] Foreign Application Priority Data

May 21, 1996 [JP] Japan ................................. 8-150075

[51] Int. Cl.⁶ .................................................. F16H 61/08
[52] U.S. Cl. ............................................. 477/97; 477/107
[58] Field of Search .............................. 477/97, 98, 120, 477/107; 701/36

[56] References Cited

U.S. PATENT DOCUMENTS

| | | | |
|---|---|---|---|
| 4,642,770 | 2/1987 | Shirley | 701/36 |
| 4,658,943 | 4/1987 | Nishikawa et al. | 701/36 X |
| 5,317,937 | 6/1994 | Yoshizawa et al. | 477/120 |
| 5,341,295 | 8/1994 | Nakagawa et al. | 477/120 X |
| 5,510,982 | 4/1996 | Ohnishi et al. | 477/120 X |
| 5,608,626 | 3/1997 | Ibamoto et al. | 477/108 X |

*Primary Examiner*—Khoi Q. Ta
*Attorney, Agent, or Firm*—Flynn, Thiel, Boutell & Tanis, P.C.

[57] ABSTRACT

An automatic transmission controller which provides smooth shifting of gears and reduces gear shifting-caused shocks during a change in speed. There is provided a control means whereby, when gear shifting of the automatic transmission is decided during a switch-on of an air-conditioning unit, then the air-conditioning unit is kept on at least during the aforesaid gear shifting. Further, the control means selects an air conditioner-on-mode timer table in order to actuate the transmission in a controlled manner, and then to control a rev-up state of the engine speed.

6 Claims, 9 Drawing Sheets

A/C CUT-PROHIBITING LOGIC

RELATIONSHIP BETWEEN SOLENOID SIGNALS AND GEAR POSITIONS

|      | 1st | 2nd | 3rd |
|------|-----|-----|-----|
| SOL1 | ○   | ×   | ×   |
| SOL2 | ○   | ○   | ×   |

○: ELECTRICALLY CONDUCTING (ON)
×: NOT ELECTRICALLY CONDUCTING (OFF)

TIMER CONTROL AT THE TIME OF D3→D2 KICK-DOWN(DOWNSHIFT)

——— : SOL2
- - - - : SOL1

AIR CONDITIONER-OFF-MODE TIMER TABLE
(DURING A/C SWITCH-OFF)

AIR CONDITIONER-ON-MODE TIMER TABLE
(DURING A/C SWITCH-ON)

RELATIONSHIP BETWEEN SOLENOID SIGNALS AND GEAR POSITIONS

|      | 1st | 2nd | 3rd |
|------|-----|-----|-----|
| SOL1 | ○   | ×   | ×   |
| SOL2 | ○   | ○   | ×   |

○ : ELECTRICALLY CONDUCTING (ON)
× : NOT ELECTRICALLY CONDUCTING (OFF)

TIMER CONTROL AT THE TIME OF D3→D2 KICK-DOWN(DOWNSHIFT)

——— : SOL2
- - - - : SOL1

SELECTION BETWEEN AIR CONDITIONER-OFF- MODE TIMER TABLE AND AIR CONDITIONER-ON-MODE TIMER TABLE

AIR CONDITIONER-OFF-MODE TIMER TABLE

AIR CONDITIONER-ON-MODE TIMER TABLE

AUTOMATIC TRANSMISSION CONTROLLER FOR CONTROLLING THE ENGINE SPEED IN RESPONSE TO AN AIR CONDITIONER OPERATING STATE DURING A DOWNSHIFT

FIELD OF THE INVENTION

This invention relates to an automatic transmission controller and, more particularly, to an automatic transmission controller designed to provide smooth shifting of transmission gears and thereby reducing gear shift-caused shocks during a change in speed and gears (i.e. downshifting or kick-down).

BACKGROUND OF THE INVENTION

As illustrated in FIG. 8, there are certain motor vehicles having the following disposed therein: an engine 202; an automatic transmission 204 having, for example, three different speed changes or gears, the transmission 204 being connected to the engine 202; and an air-conditioning unit (A/C) 206 driven by the engine 202. The air-conditioning unit 206 is provided with a compressor 208.

The transmission 204 is provided with a torque converter 210, a first solenoid (SOL1) 212, and a second solenoid (SOL2) 214, both of these solenoids providing speed or gear change control. The first and second solenoids 212, 214 are actuated by a control unit (ECU) 216 so as to execute speed or gear change control. The control unit 216 includes a mode timer table-selecting circuit 218. In addition, the control unit 216 communicates, for example electronically, with: an air conditioner switch 220 for detecting an on or off state of the air-conditioning unit 206, specifically an on or off state of the compressor 208; a throttle opening sensor 222 for detecting the degree of throttle opening; an engine speed sensor 224 for detecting engine speed determined by the number of engine revolutions; and a vehicle velocity sensor 226 for detecting vehicle velocity. Further, when gear shifting of the transmission 204 is decided, or when a downshift or kick-down, for example from a third drive gear D3 to a second drive gear D2, is decided, then the control unit 216 sets a speed change resumption-prohibiting time T6 (see FIG. 14) to preclude other gear shifting during the aforesaid decided act of gear shifting. Then, the control unit 216 selects one of an air conditioner-off-mode timer table (see FIG. 12) and an air conditioner-on-mode timer table (see FIG. 13), depending on whether the air-conditioning unit 206 is in an on or off state. The transmission 204 is thereby actuated and controlled, i.e., an on-time of the first solenoid 212 is controlled, and then a rev-up state of an engine speed is controlled. In short, when the kick-down (downshift) occurs, which is an act of gear shifting from one gear to a lower gear, for example drive gear D3 to drive gear D2, then the control unit 216 executes timer control in which a first speed or gear selection in transmission 204 (a neutral state) is provided substantially midway therebetween in order to promote an increase in the engine speed (FIG. 10).

However, for conventional automatic transmission controllers, even when the above-mentioned conventional timer control is effected after the decision to downshift from drive gear D3 to drive gear D2 as previously mentioned, desired timer values cannot be selected in spite of the fact that a rev-up speed of the engine speed varies depending on whether the air-conditioning unit 206 is in an on or off state (more specifically whether the compressor 208 is on or off). As a result, a timer value mismatch (an improper combination) causes either an excessive rev-up or an insufficient rev-up of the engine speed. This brings about inconveniences of non-smooth gear shifting and heavy shocks associated with such non-smooth shifting.

Details on the above will now be explained with reference to the drawings. As can be seen from the FIG. 9 chart showing the relationship between solenoid signals and gear positions, the control unit 216 causes both of the first and second solenoids 212, 214 to be powered on (electrically conducting) at a stage of the first speed or gear (1st). At a stage of a second speed or gear (2nd), the first solenoid 212 is off (not electrically conducting), while the second solenoid 214 is on (electrically conducting). At a stage of a third speed or gear (3rd), both of the solenoids are off (not electrically conducting).

As illustrated in the FIG. 10 timing diagram, when the kick-down from drive gear D3 to drive gear D2 occurs, the control unit 216 provides the timer control to retain a rev-up time of the engine speed in response to the output of solenoid signals by way of drive D1, where D1 is neutral, (the first speed is a neutral state and is operated by the aid of a one-way clutch) being interposed substantially midway between the gear shifting from D3 to D2. This is to put the automatic transmission 204 into neutral state because a rapid increase in the engine speed is hindered by the transmission mass that acts as an inertial force or drag. Conversely, there is another method in which the engine speed is increased by way of downshift followed by a back drive thereof from the rotational force from tires and inertial force of the vehicle. However, the back drive method cannot be employed because shocks are generated as is in the case with engine braking. In a drive range (D range), in view of a structure of the transmission 204, a neutral state cannot be reached, but at the first speed rotational power of the engine is transmitted to the tires through the one-way clutch in the transmission. As a result, the back drive from the tires is intercepted by the one-way clutch and prevented from being conducted to an engine. Shocks caused by engine braking are eliminated. In addition, the one-way clutch rotates faster on the side thereof connected to the tires, and is left released from the inertial force created by the transmission mass. That is, gears may be once shifted to a speed change stage at which rotational power is transmitted through the one-way clutch. The speed change stage is lower in speed than a speed change stage after the kick-down.

As can be seen from FIG. 11, for execution of the aforesaid timer control, when the kick-down or gear shifting from drive gear D3 to drive gear D2 occurs (step 302), it is then determined whether or not the compressor 208 of the air-conditioning unit 206 is on (step 304). When the compressor 208 is off, and thus the determination of step 304 is "NO", then the timer control is executed in accordance with the air conditioner-off-mode timer table, FIG. 12 (step 306). Meanwhile, when the compressor 208 is on, and thus the determination of step 304 is "YES", then the timer control is executed in accordance with the air conditioner-on-mode timer table, FIG. 13 (step 308). In addition, as illustrated in FIG. 14, while the timer control is executed, speed change resumption-prohibiting time T6 is set, which excludes other gear shifting acts in the course of the aforesaid decided act of gear shifting.

More specifically, when the compressor 208 is off, then no rotation is imparted to the compressor 208 with a significant load thereon (an off-state of the air conditioner switch 220), and then the rev-up of the engine speed is faster. In this case, as illustrated in FIG. 12, timer data in the air conditioner-off-mode timer table is selected. Then, the on-time of the first solenoid 212 is controlled so as to be shorter, and an acceptable extent of the rev-up of the engine speed is made smaller. Meanwhile, when the compressor 208 is on, then rotation is imparted to the compressor 208 with a significant load being exerted thereon (an on-state of the air conditioner switch 220), and then the rev-up of the engine speed is slower. In the on-state of the air conditioner switch, as illustrated in FIG. 13, timer data in the air conditioner-on-mode timer table is selected. Then, the on-time of the first solenoid 212 is controlled so as to be longer, and an allowable extent of the rev-up of the engine speed is made greater.

For the above reason, the mode timer tables are forced into proper use, depending on different characteristics of the rev-up of the engine speed. More specifically, the mode timer tables must properly be used from the standpoint of an increasing rate of the engine speed is less because of the load of the compressor 208, and the further standpoint of the load of the compressor 208 causes the engine speed (the number of rotation at the beginning of the increase) to be lower than when the compressor 208 experiences no load.

However, even when the control unit 216 is provided with such timer control logic as shown in FIG. 11, enhancement in engine output occurs when a throttle opening degree (THR) exceeds a compressor-out-of-operation-specified opening degree. Thus, a control is executed to cut (stop) the compressor 208 from being driven for a predetermined period of time, e.g. only ten seconds, immediately after the throttle opening degree (THR) recognizes the compressor-out-of-operation-specified opening degree. Consequently, the air-conditioning unit 206 appears off to the control unit 216; however, as a matter of fact, it does not mean that the load of the compressor 208 reaches zero upon switch-off of the air-conditioning unit 206. This means that the load of the compressor 208 is left for a certain period of time and reduces the rate of increase of engine speed. Accordingly, although the air conditioner-on-mode timer table (FIG. 13) should be selected as a mode timer table, an actual selection is made to the air conditioner-off-mode timer table (FIG. 12). The air conditioner-off-mode timer table is selected because the air conditioning compressor 208 is powered off substantially simultaneously with a speed change judgment (downshift or kick-down) despite the air-conditioning unit 206 being actually on, i.e. the compressor is stopped (cut) for the predetermined period of time, see FIG. 14 at 249. This causes inconveniences in that the rev-up time of the engine speed is insufficient, and thus gear shifting-caused shocks occur to a greater degree (FIG. 14). The G-waveform 250 at the front and rear of the vehicle has an unmatched engine speed which produces heavy pulling shocks because of the engine braking effect even though the acceleration pedal is pressed for increasing the engine speed. More specifically, when the kick-down or down shift occurs, then control is executed to power off the compressor 208 for some ten seconds in order to increase the engine speed at a faster rate. In order to select this timer mode table, switch-on/off of the compressor 208 is monitored at about twenty second intervals.

SUMMARY OF THE INVENTION

To obviate or minimize the aforesaid inconveniences, the present invention provides an automatic transmission controller for a vehicle provided with an engine, an automatic transmission connected to the engine, and an air-conditioning unit driven by the engine. When gear shifting of the transmission is decided, the controller sets a speed change resumption-prohibiting time to preclude other gear shifting acts in the course of the above-mentioned decided act of gear shifting. Further, the controller selects one of an air conditioner-off-mode timer table and an air conditioner-on-mode timer table depending upon whether the air-conditioning unit is in an on or off state in order to actuate and control the transmission, and then to control a rev-up state of an engine speed. The controller has a control unit or means whereby, when gear shifting of the transmission is decided during a switch-on of the air-conditioning unit, then the air-conditioning unit is kept on at least during the aforesaid gear shifting, the control means further selecting the air conditioner-on-mode timer table in order to actuate and control the transmission, and then to control the rev-up state of the engine speed.

According to the present invention, when the transmission is decided to undergo a change in gear during a switch-on of the air-conditioning unit, then the air-conditioning unit is left on at least during the aforesaid gear shifting. Further, the air conditioner-on-mode timer table is selected to actuate the automatic transmission in a controlled manner, and then to control the rev-up state of the engine speed. As a result, it is possible to obtain a proper timer value for the rev-up time of the engine speed during gear shifting. In addition, it is possible to provide smooth shifting of gears, thereby diminishing the shocks that are incidental to gear shifting.

DETAILED DESCRIPTION

Figure 1:
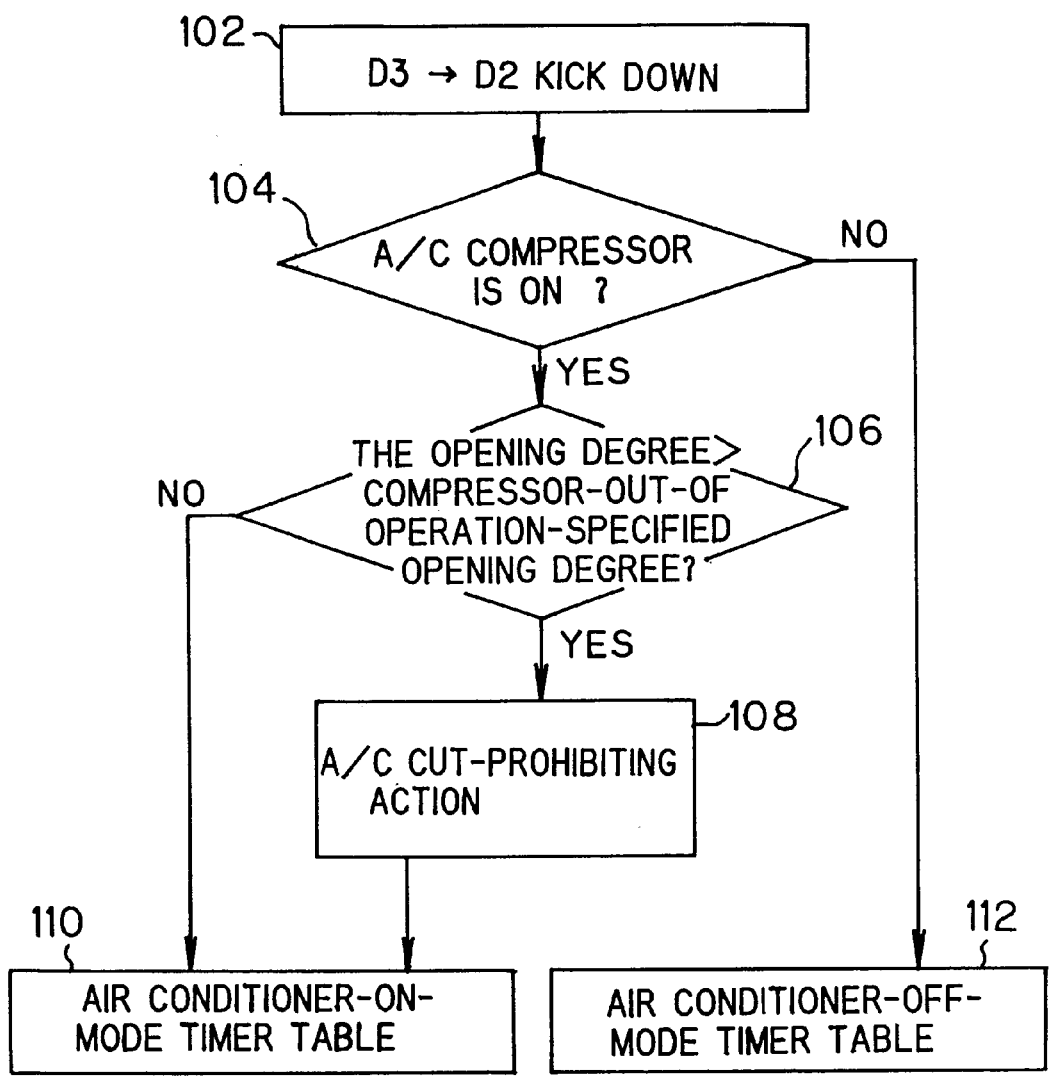
FIG. 1 is a flow chart illustrating how an automatic transmission is controlled with air conditioning cut (stop) logic incorporated therein according to the present invention.

An embodiment of the present invention will now be described with reference to FIGS. 1–7. In FIG. 3, reference numeral 2 denotes an engine which is disposed in a vehicle (not shown); and 4 denotes an automatic transmission which functions with, e.g., three different speed changes or gears. The transmission 4 is connected to the engine 2.

The vehicle has an air-conditioning unit (A/C) 6 installed therein, which unit is driven by the engine 2. The air-conditioning unit 6 is provided with a compressor 8 for an air-conditioning operational purpose.

The transmission 4 is provided with a torque converter 10, a first solenoid (SOL1) 12, and a second solenoid (SOL2) 14, both of these solenoids providing speed change control. The first and second solenoids 12, 14 are actuated and controlled by a control unit (ECU) 16 so as to execute speed change control of the transmission 4. The control unit 16 may be an electronic control unit, for example an integrated circuit.

The control unit 16 is provided with a mode timer table-selecting circuit 18. In addition, the control unit 16 communicates with: an air conditioner switch 20 for detecting an on-off state of the air-conditioning unit 6 (i.e. an on-off state of the compressor 8); a throttle opening sensor 22 for detecting a throttle opening degree; a vehicle velocity sensor 24 for detecting a vehicle velocity; and an engine speed sensor 26 for detecting the engine speed measured by the number of engine revolutions. The control unit 16 may be electrically connected with the switch 20 and sensors 22, 24, 26 for communication therewith.

Figures 4, 5:
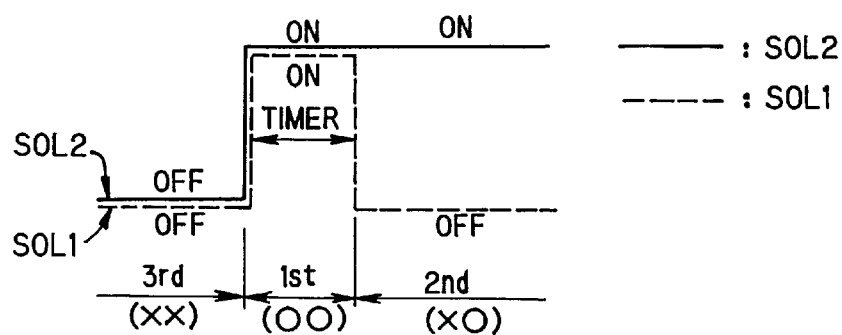
FIG. 4 is an illustration showing a relationship between solenoid signals and gear positions.
FIG. 5 is a time chart illustrating timer control of the solenoids at the time of a downshift (kick-down)
Figure 6:
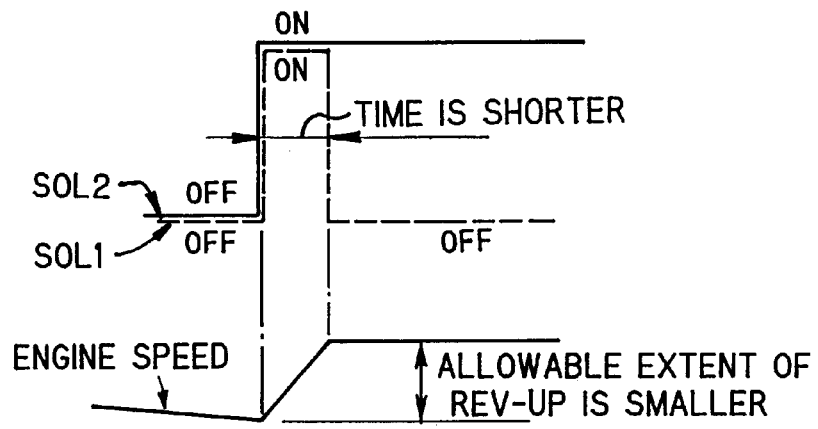
FIG. 6 is an illustration showing an air conditioner-off-mode timer table during switch-off of an air-conditioning unit and corresponding engine speed.
Figure 7:
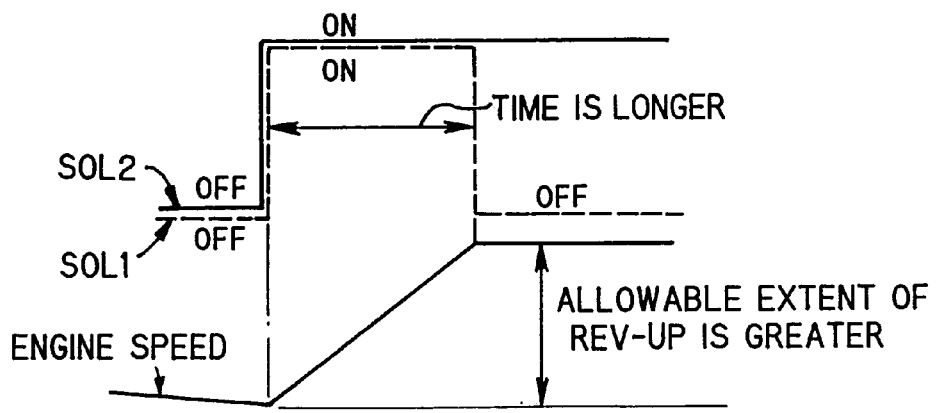
FIG. 7 is an illustration showing an air conditioner-on-mode timer table during switch-on of the air-conditioning unit and corresponding engine speed.
Figure 8:
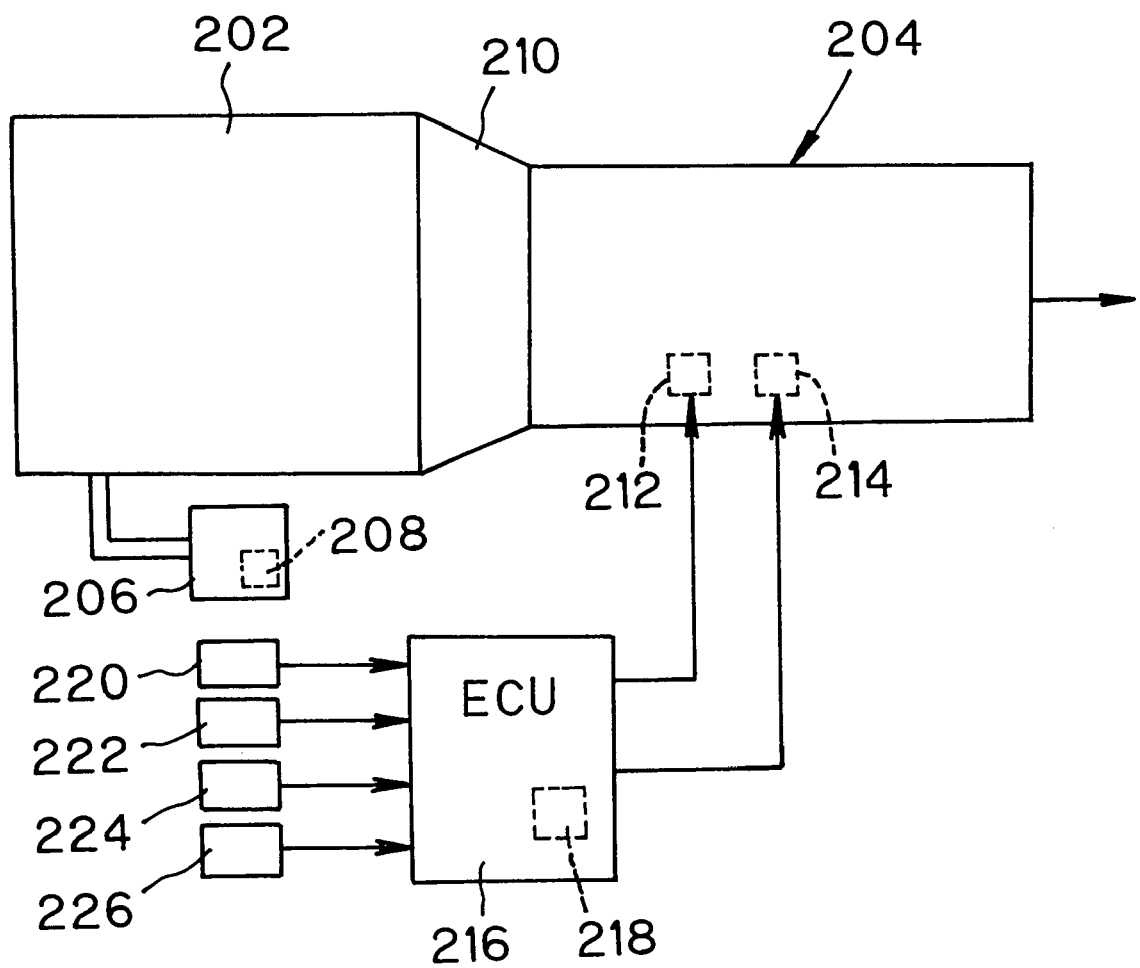
FIG. 8 is a schematic structural view illustrating a conventional engine and a conventional automatic transmission.
Figures 9, 10:
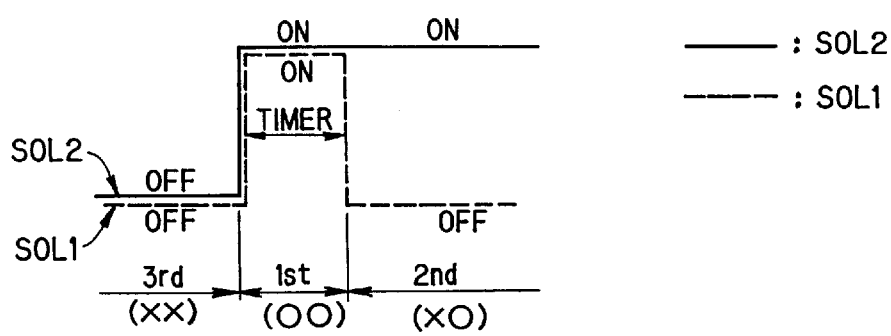
FIG. 9 is an illustration showing a conventional relationship between solenoid signals and gear positions.
FIG. 10 is a time chart illustrating conventional timer control at the time of kick-down.
Figure 11:
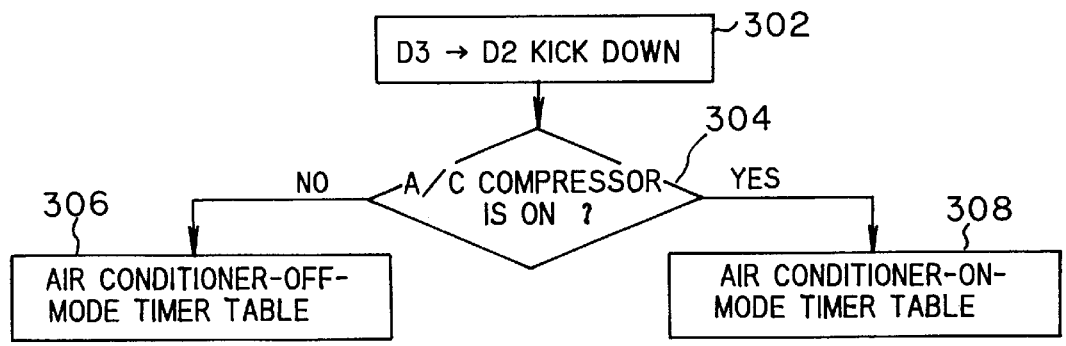
FIG. 11 is a flow chart illustrating conventional control of the automatic transmission.
Figure 12:
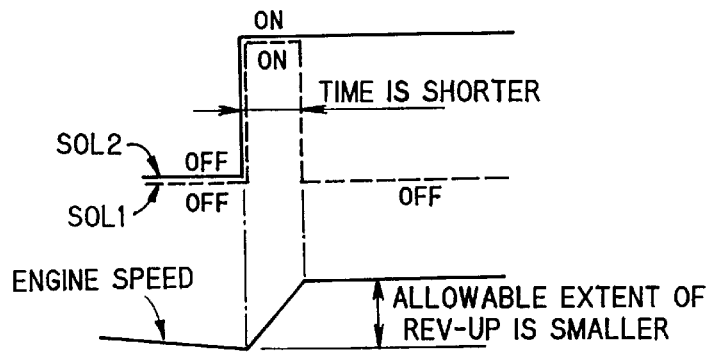
FIG. 12 is an illustration showing a conventional air conditioner-off-mode timer table during switch-off of an air-conditioning unit.
Figure 13:
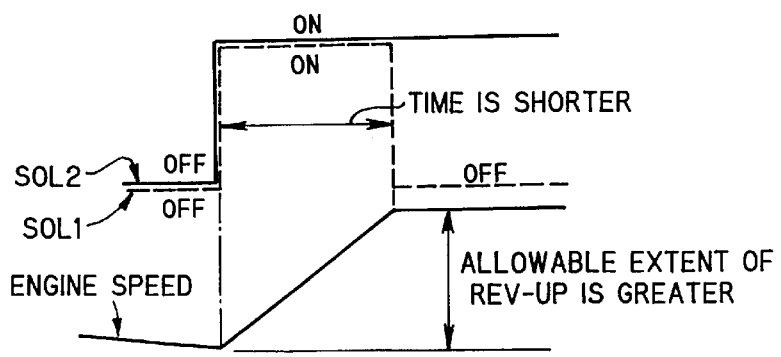
FIG. 13 is an illustration showing a conventional air conditioner-on-mode timer table during switch-on of the air-conditioning unit.
Figure 14:
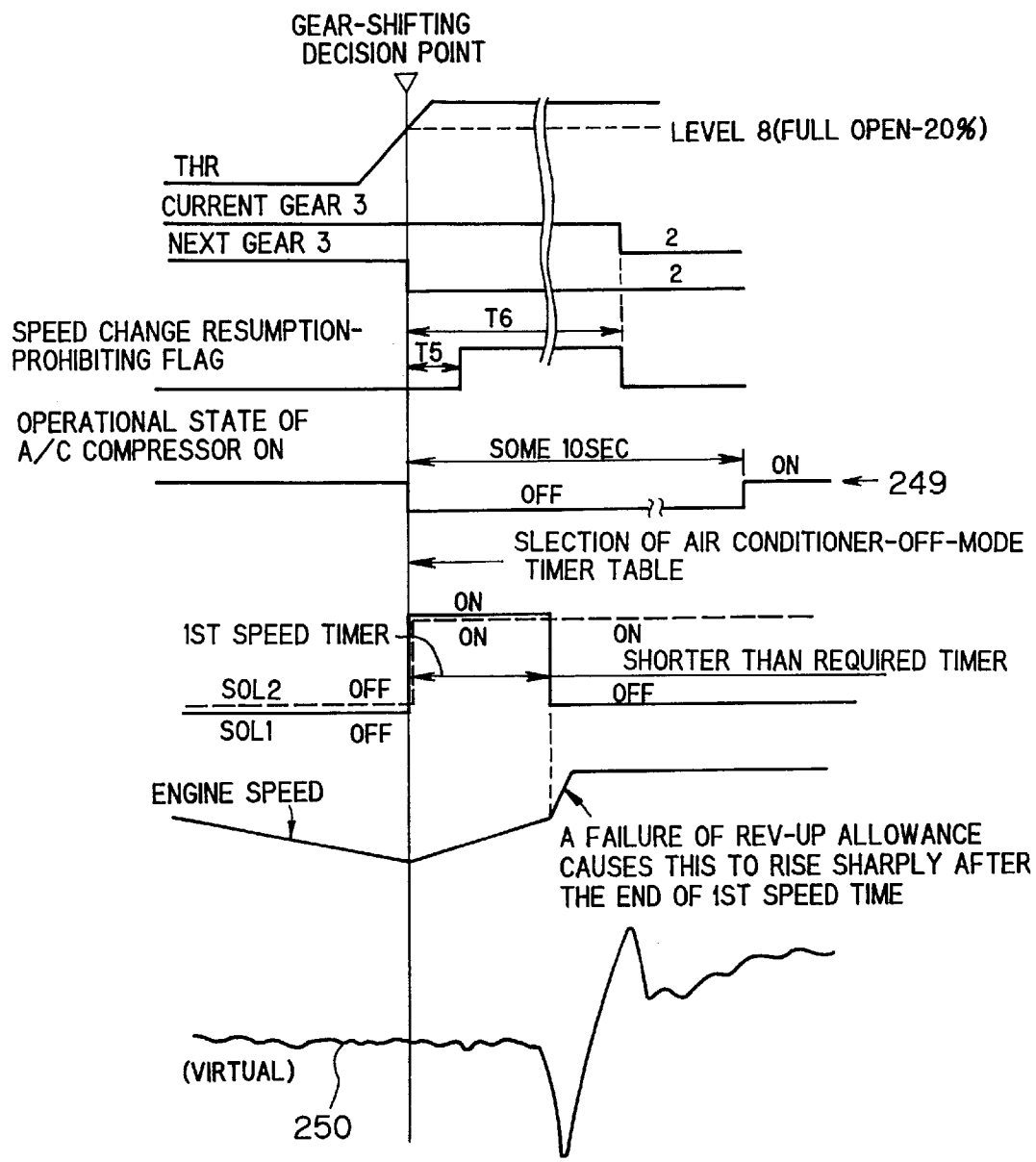
FIG. 14 is a time chart illustrating conventional control of the automatic transmission producing heavy pulling shocks.
Figure 1:
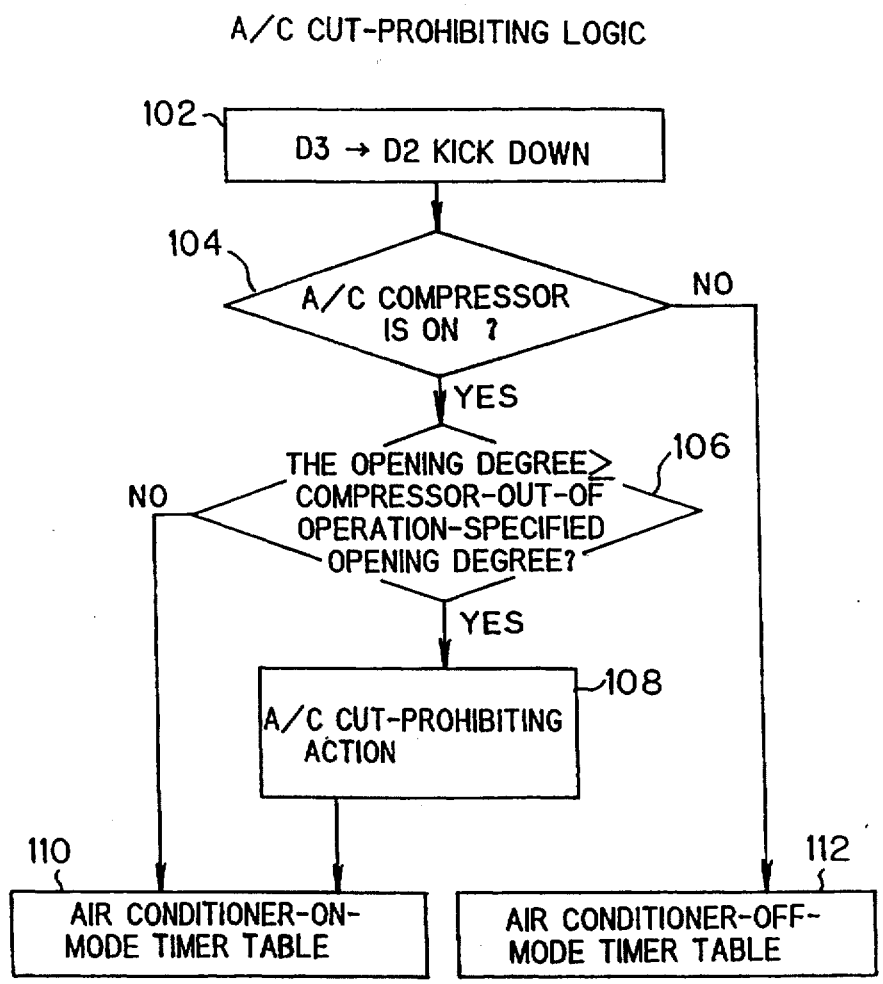
Figure 2:
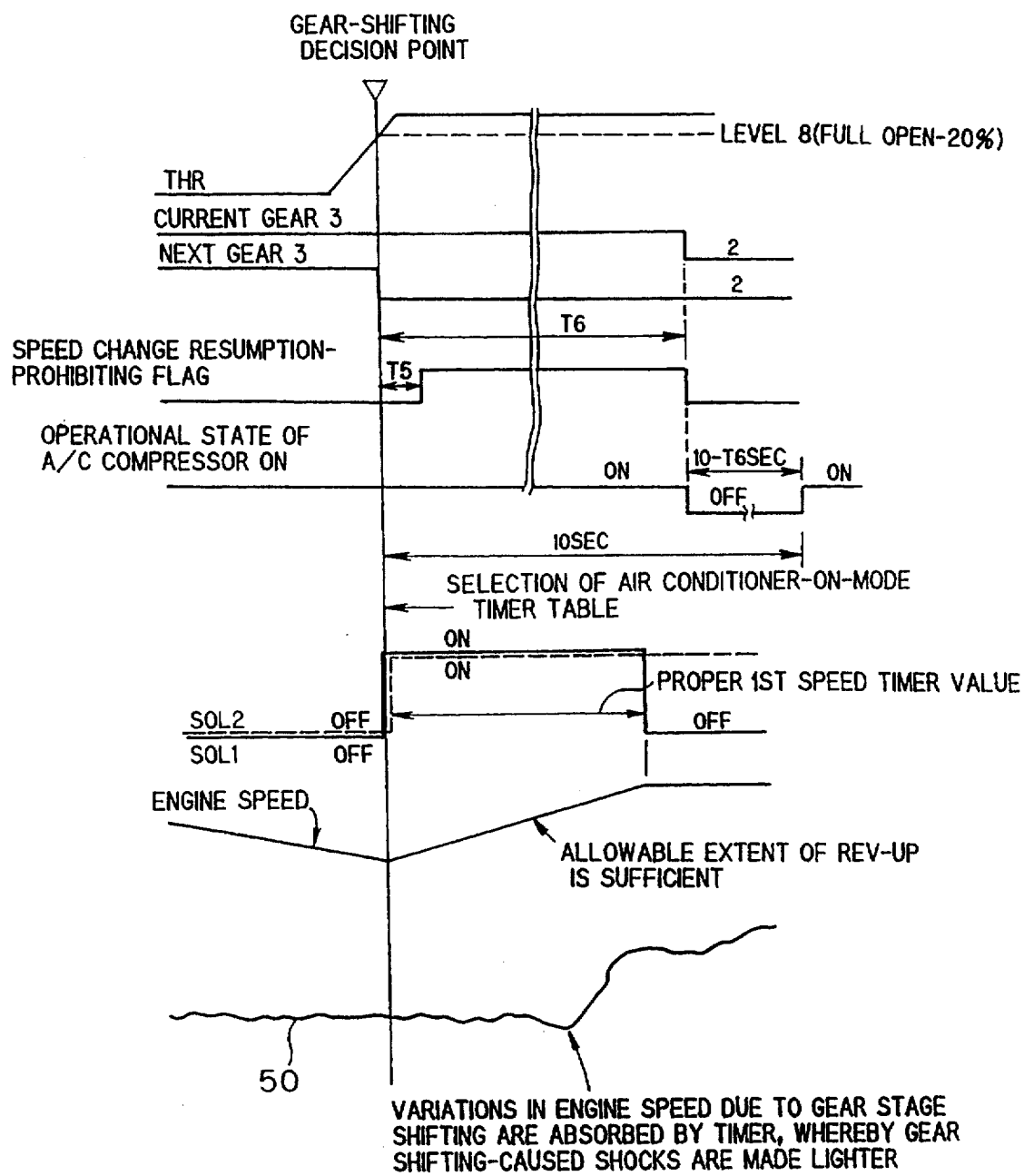
Figures 9, 10:
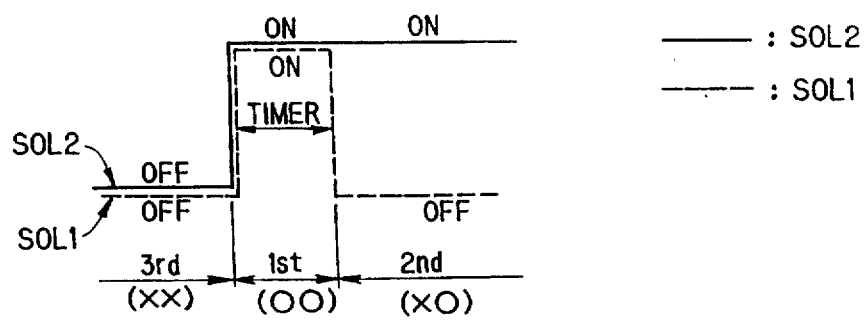
Figure 11:
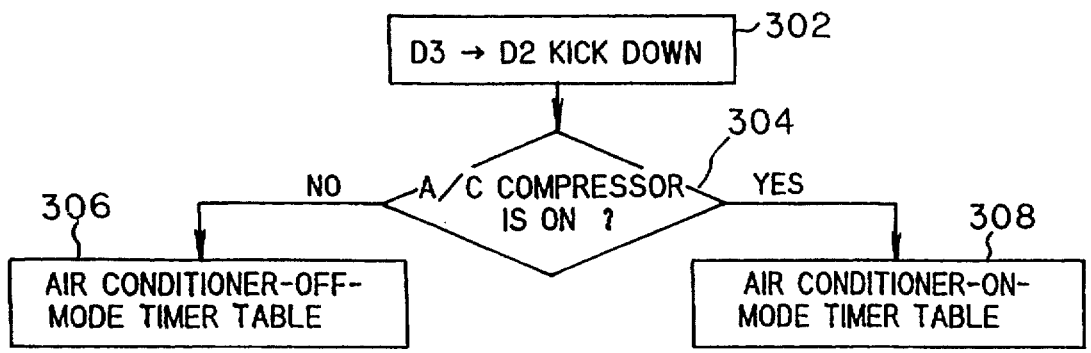
Figure 12:
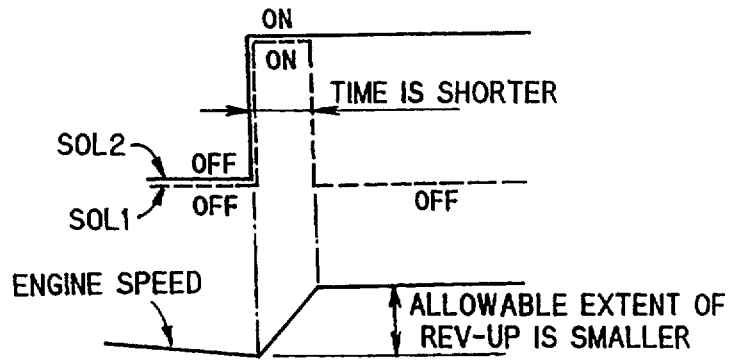
Figure 13:
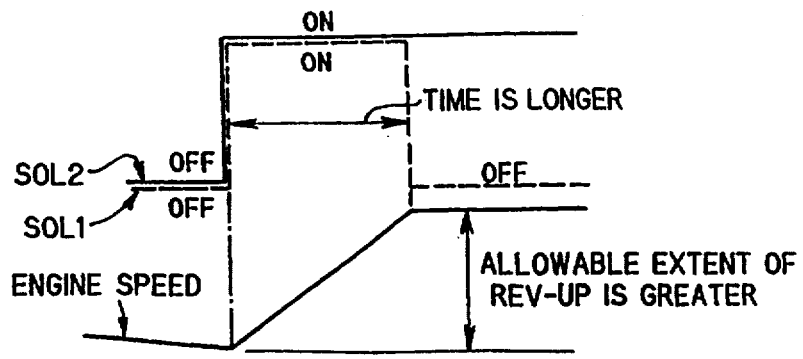

As illustrated in FIG. 4, the control unit 16 typically causes the first and second solenoids 12, 14 to be powered on (electrically conducting) at a stage of a first speed (1st) which is neutral. At a stage of a second speed (2nd), the first solenoid 12 is off (not electrically conducting), while the second solenoid 14 is on (electrically conducting). At a stage of a third speed (3rd), these two solenoids are rendered off (not electrically conducting).

Turning now to FIG. 5, when gear shifting, e.g. kick-down or downshifting which is an act of change in gears from drive gear D3 to drive gear D2, is decided, then the control unit 16 executes a timer control in which the first speed (1st, a neutral state) is provided substantially midway therebetween. Further, while the timer control is executed, an air conditioner-off-mode timer table (FIG. 6) is selected when the compressor 8 is off. Then, an on-time of the first solenoid 12 for control over actuation of the transmission 4 is controlled so as to be shorter. Meanwhile, when the compressor 8 is on, an air conditioner-on-mode timer table (FIG. 7) is selected, thereby the on-time of the first solenoid 12 for control over actuation of the transmission 4 is controlled so as to be longer.

Figure 2:
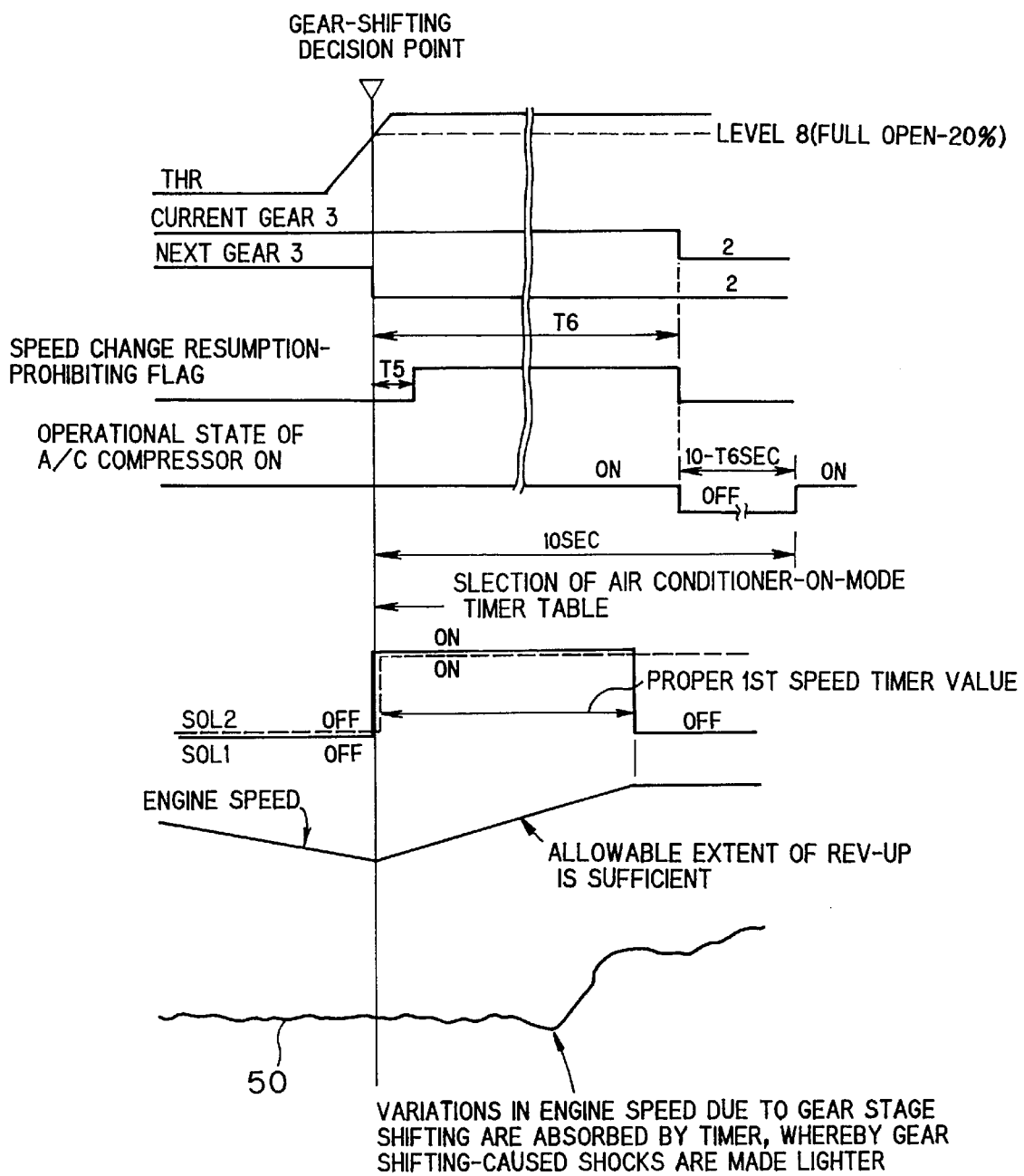
FIG. 2 is a time chart illustrating how the transmission is controlled according to the present invention.
Figure 3:
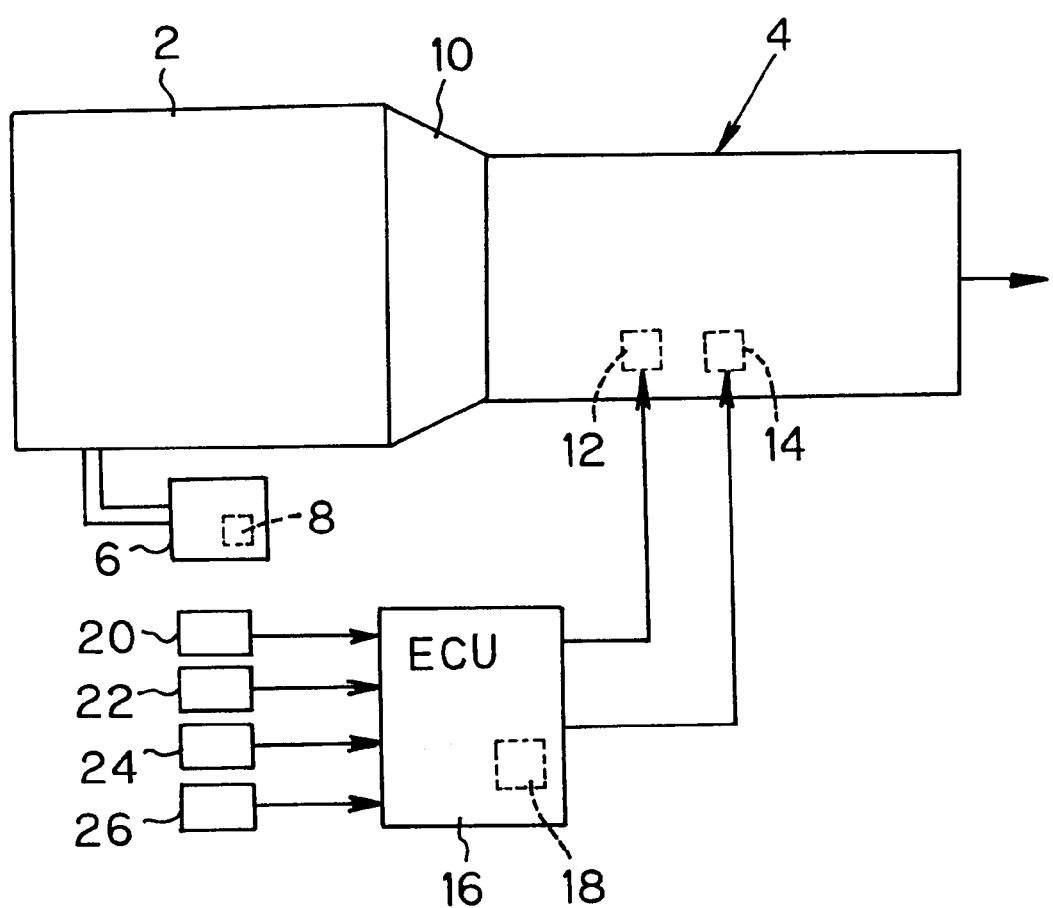
FIG. 3 is a schematic structural view showing an engine, a transmission, and the automatic controller.

Further, the control unit 16 includes air conditioner cut-prohibiting or shut-off prohibiting logic (FIG. 1) in which: when a gear shifting operation (kick-down) is decided during switch-on of the air-conditioning unit 6, then the control unit 16 sets speed change resumption-prohibiting time T6 to preclude other gear shifting acts during the above antecedent gear shifting act, as shown in FIGS. 1 and 2. Then the air-conditioning unit 6 is maintained switched on at least during the aforesaid gear shifting. Further, the air conditioner-on-mode timer table (FIG. 7) is selected. Next, the air-conditioning unit 6 is controlled to be off for a predetermined period of time (e.g., ten seconds) after speed change resumption-prohibiting time T6 elapses.

The operation of the present invention will be described with reference to a flow chart in FIG. 1.

When a vehicle is traveling in a state of the present gear position (current gear) and the next gear position (next gear) being a third speed gear and a second speed gear, respectively, then kick-down from drive gear D3 to D2, which is a gear shifting operation of the automatic transmission 4, occurs during switch-on of the air-conditioning unit 6 (step 102). Then, a determination is made as to whether the compressor 8 is powered on (step 104).

When the compressor 8 is on, and thus step 104 results in "YES", then the following determination is made as to whether or not a throttle opening degree (THR) achieves (i.e. at least attains) a compressor-out-of-operation-specified opening degree (step 106).

When step 106 gives a "NO" result, the air conditioner-on-mode timer table (FIG. 7) is selected (step 110). Then, the on-time of the first solenoid 12 is rendered longer in accordance with the aforesaid timer table, and an allowable extent of the engine speed is made greater to control a rev-up state of the engine speed.

When step 106 gives a "YES" result, it means cut or shut-off control of the air-conditioning unit 6 is selected (step 108). Then, the cutting or shutting off of the air-conditioning unit 6 is prohibited. More specifically, the air-conditioning unit 6 is forcibly kept switched on at least during gear shifting, i.e., during speed change resumption-prohibiting time T6 (step 108). The speed change resumption-prohibiting time T6 is delayed a start time TS. Then, the air conditioner-on-mode timer table (FIG. 7) is selected (step 110). The on-time of the first solenoid 12 is prolonged in accordance with the aforesaid timer table, and an allowable extent of the engine speed is increased to control a rev-up state of the engine speed.

Meanwhile, when the air-conditioning unit 6 is off, step 104 gives a "NO" result and the air conditioner-off-mode timer table (FIG. 6) is selected (step 112). Then, the on-time of the first solenoid 12 is made shorter in accordance with the off-mode timer table, and an allowable extent of the engine speed is rendered smaller to control a rev-up state of the engine speed.

As a result, a correct mode timer table is selected at the timer of gear shifting (kick-down) of the transmission 4, whereby a proper timer value is selected. This eliminates an incomplete state, as seen in the past, in which the compressor 8 is switched off while gear shifting when the compressor 8 is actuated before gear shifting. Then, it is possible to provide a smooth gear shifting, and thus to reduce gear shifting-caused shocks. The smooth gear shifting is evidenced by the G-waveform 50 at the front and rear of the vehicle illustrating the gear shifting-caused shocks are reduced in magnitude. This is particularly useful for a vehicle whose engine output is relatively small.

In addition, the compressor 8 in the air-conditioning unit 6 is powered off only for a predetermined period of time (e.g., 10-T6 seconds) after at least a gear-shifting period of time, i.e. after speed change resumption-prohibiting time T6 elapses. Accordingly, it is possible to ensure sufficient engine output required after the gear shifting from drive gear D3 to D2.

As evidenced by the above description, according to the present invention there is provided a control means whereby, when gear shifting of the automatic transmission is decided, then the air-conditioning unit is left on at least during the aforesaid gear shifting. In addition, the control means selects the air conditioner-on-mode timer table in order to actuate the transmission in a controlled manner, and then to control a rev-up state of the engine speed. As a result, it is possible to provide a proper timer value of the rev-up time of the engine speed during gear shifting. In addition, it is possible to provide smooth gear shifting, thereby reducing gear shifting-caused shocks.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an automatic transmission controller for a vehicle provided with an engine; an automatic transmission connected to said engine; and an air-conditioning unit including a compressor driven by said engine; in which, when a gear shifting act of said transmission is decided, said controller sets a speed change resumption-prohibiting time to preclude other gear shifting acts in the course of the above-mentioned decided gear shifting act and further said controller selects one of an air conditioner-off-mode timer table and an air conditioner-on-mode timer table, depending upon whether said air-conditioning unit is in an on or off state, in order to actuate and control said transmission and then to control a rev-up state of the speed of the engine; the improvement comprising: a control means which, when said transmission is down shifted, determines whether the compressor is in an on or off state, wherein said control means selects said air conditioner-off-mode timer table to activate and control said transmission when said compressor is in the off state, wherein said control means selects said air conditioner-on-mode timer table to actuate and control said transmission when said compressor is in the on state, and wherein said control means forcibly maintains said air conditioning unit powered on for at least said speed change resumption-prohibiting time when a throttle opening degree is equal to or greater than a compressor deactivation opening degree, and said control means controlling the rev-up state of the engine speed after said speed change resumption prohibiting time has elapsed.

2. A method for controlling gear shifting in an automatic transmission of a vehicle, comprising the steps of:

deciding to downshift the transmission;

selecting a speed change resumption time prohibiting gear shifting acts other than the decided downshift until after the expiration of the speed change resumption time;

selecting an air conditioning off-mode timing table if the air conditioner in the vehicle is off;

determining if the air conditioner is on and if a throttle opening degree is less than a compressor deactivation opening degree;

selecting an air conditioner on mode timing table if the throttle opening degree is less than the compressor deactivation opening degree;

selecting the air conditioner on-mode timing table and holding the air conditioner in the on state for only the speed change resumption time if the throttle opening degree is equal to or greater than the compressor deactivation opening degree;

controlling the rev-up state of an engine based on the selected timing table; and shifting the transmission to the decided gear.

3. The method according to claim 2, wherein the step of controlling the rev-up state of the engine includes the step of shifting the transmission into neutral either for a first time period corresponding to the on-mode timing table or for a second time period corresponding to the off-mode timing table intermediate shifting from the previous gear to the next gear.

4. The method according to claim 2, further comprising the step of shutting off the air conditioner after holding the air conditioner in an on state and after expiration of the speed change resumption time.

5. The control means according to claim 1, wherein said control means includes means for preventing switch off of said compressor only for a predetermined period of time after said speed change resumption-prohibiting time elapses.

6. The control means according to claim 1, wherein said air conditioning unit is forcibly maintained powered on for only said speed change resumption time when said throttle opening degree is equal to or greater than the compressor deactivation opening degree.

* * * * *

UNITED STATES PATENT AND TRADEMARK OFFICE
CERTIFICATE OF CORRECTION

PATENT NO. : 5 897 455
DATED : April 27, 1999
INVENTOR(S) : Hiroyuki SATO, et al.

It is certified that error appears in the above-identified patent and that said Letters Patent is hereby corrected as shown below:

Replace Figures 1, 2, and 9-14 with the enclosed corrected Formal Drawing Figures 1, 2, and 9-14.

In the drawing on the title page, replace ">" with ---$\geq$---, as shown on the attached page.

Signed and Sealed this

Twenty-first Day of March, 2000

Q. TODD DICKINSON

*Attest:*

*Attesting Officer*  *Commissioner of Patents and Trademarks*

United States Patent [19]

Sato et al.

[11] Patent Number: 5,897,455
[45] Date of Patent: Apr. 27, 1999

[54] AUTOMATIC TRANSMISSION CONTROLLER FOR CONTROLLING THE ENGINE SPEED IN RESPONSE TO AN AIR CONDITIONER OPERATING STATE DURING A DOWNSHIFT

[75] Inventors: Hiroyuki Sato; Tomoo Mochizuki. both of Shizuoka-ken, Japan

[73] Assignees: Suzuki Motor Corporation; Jatco Corporation. both of Shizuoka-ken, Japan

[21] Appl. No.: 08/858,524

[22] Filed: May 19, 1997

[30] Foreign Application Priority Data

May 21, 1996 [JP] Japan ................... 8-150075

[51] Int. Cl.⁶ ............................ F16H 61/08
[52] U.S. Cl. .......................... 477/97; 477/107
[58] Field of Search .................. 477/97, 98, 120, 477/107; 701/36

[56] References Cited

U.S. PATENT DOCUMENTS

| | | | |
|---|---|---|---|
| 4,642,770 | 2/1987 | Shirley | 701/36 |
| 4,658,943 | 4/1987 | Nishikawa et al. | 701/36 X |
| 5,317,937 | 6/1994 | Yoshizawa et al. | 477/120 |
| 5,341,295 | 8/1994 | Nakagawa et al. | 477/120 X |
| 5,510,982 | 4/1996 | Ohnishi et al. | 477/120 X |
| 5,608,626 | 3/1997 | Ibamoto et al. | 477/108 X |

*Primary Examiner*—Khoi Q. Ta
*Attorney, Agent, or Firm*—Flynn, Thiel, Boutell & Tanis, P.C.

[57] ABSTRACT

An automatic transmission controller which provides smooth shifting of gears and reduces gear shifting-caused shocks during a change in speed. There is provided a control means whereby, when gear shifting of the automatic transmission is decided during a switch-on of an air-conditioning unit, then the air-conditioning unit is kept on at least during the aforesaid gear shifting. Further, the control means selects an air conditioner-on-mode timer table in order to actuate the transmission in a controlled manner, and then to control a rev-up state of the engine speed.

6 Claims, 9 Drawing Sheets

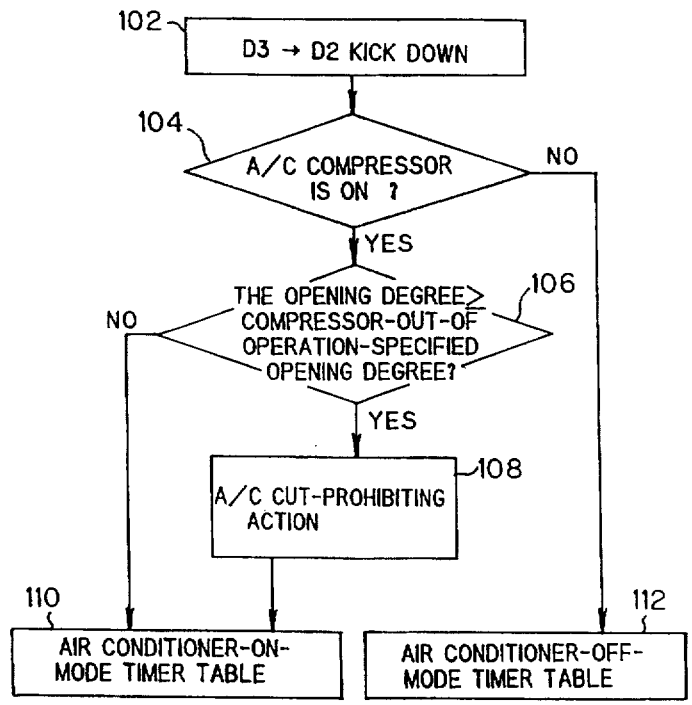

RELATIONSHIP BETWEEN SOLENOID SIGNALS AND GEAR POSITIONS

|      | 1st | 2nd | 3rd |
|------|-----|-----|-----|
| SOL1 | ○   | ×   | ×   |
| SOL2 | ○   | ○   | ×   |

○ : ELECTRICALLY CONDUCTING (ON)
× : NOT ELECTRICALLY CONDUCTING (OFF)

TIMER CONTROL AT THE TIME OF D3→D2 KICK-DOWN(DOWNSHIFT)

——— : SOL2
—·—·— : SOL1

SELECTION BETWEEN AIR CONDITIONER-OFF- MODE TIMER TABLE AND AIR CONDITIONER-ON-MODE TIMER TABLE

AIR CONDITIONER-OFF-MODE TIMER TABLE

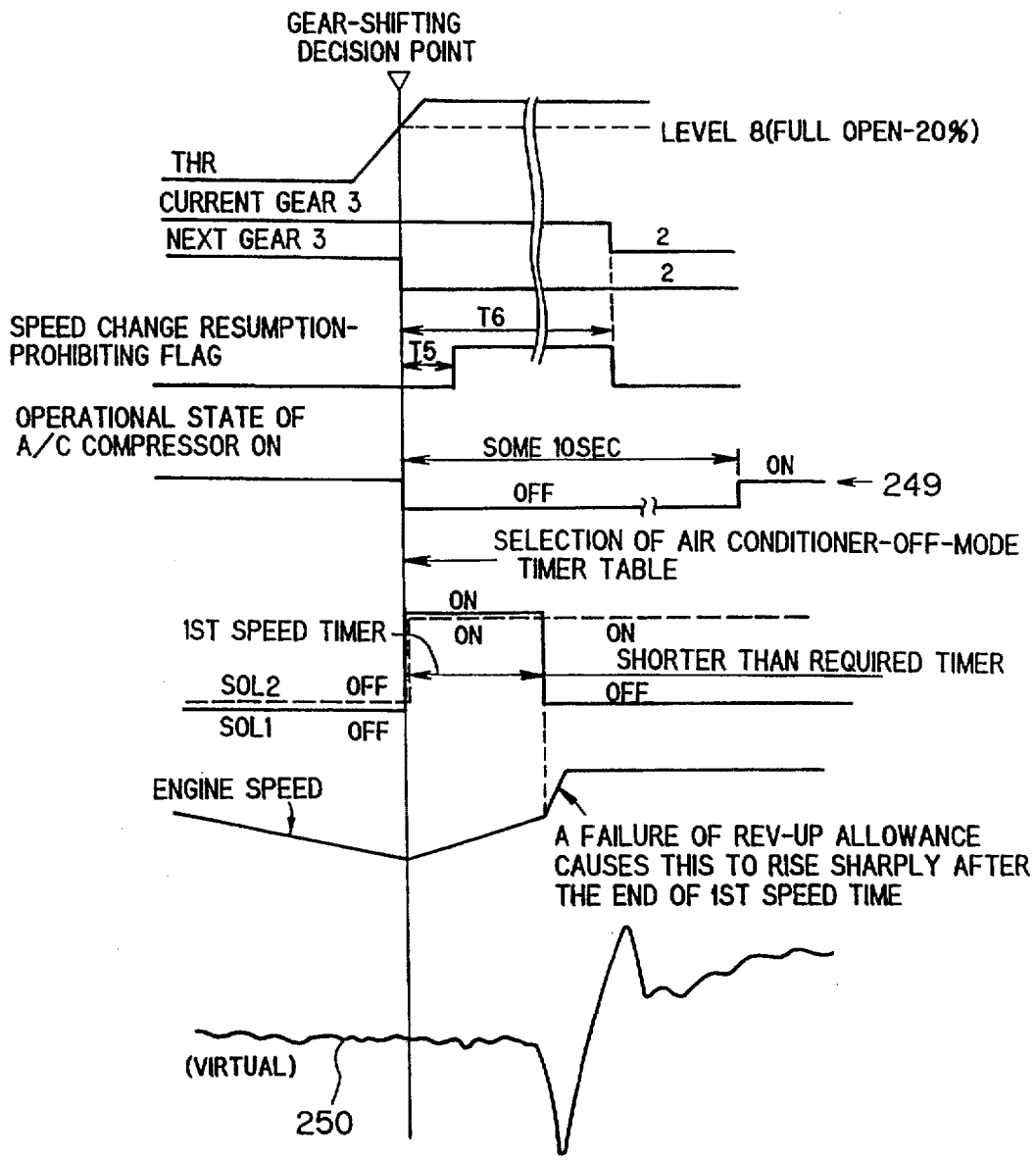

AIR CONDITIONER-ON-MODE TIMER TABLE